Dec. 23, 1952     E. F. CONRAD     2,622,463

HOLDER FOR GENERATOR PULLEYS

Filed June 2, 1950

INVENTOR
EDGAR F. CONRAD

BY

ATTORNEY

Patented Dec. 23, 1952

2,622,463

UNITED STATES PATENT OFFICE 2,622,463

HOLDER FOR GENERATOR PULLEYS

Edgar F. Conrad, Milwaukie, Oreg.

Application June 2, 1950, Serial No. 165,829

1 Claim. (Cl. 81—44)

This invention relates generally to automotive tools and particularly to a holder for generator pulleys.

The main object of this invention is to provide a simple and efficient form of holder for generator pulleys by means of which the fastening nut may be tightened or released without in any way injuring the pulley or associated parts.

The second object is to make a holder of the class described which will be adaptable to any ordinary size of pulley.

The third object is to construct the holder from standard shapes such as round rod or tubing and to so hinge the parts that the hinging face is in the plane of holding.

I accomplish these and other objects in the manner set forth in the following specification as illustrated by the accompanying drawings, in which.

Like numbers of reference refer to the same or similar parts throughout the several views.

Figure 1:
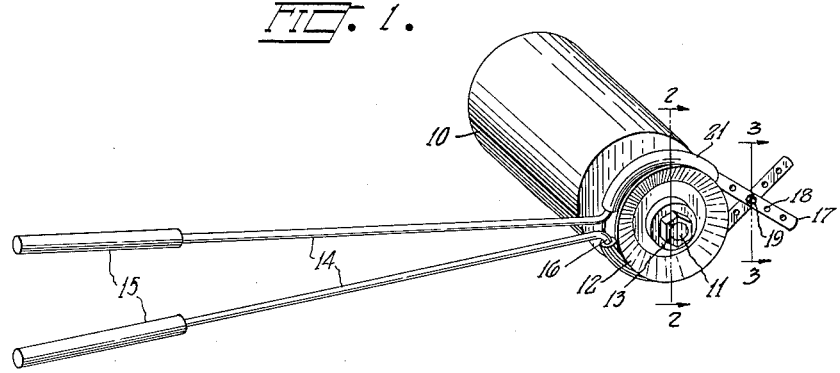
Fig. 1 is a perspective view of a generator showing my holder placed on the pulley of the generator.
Figure 2:
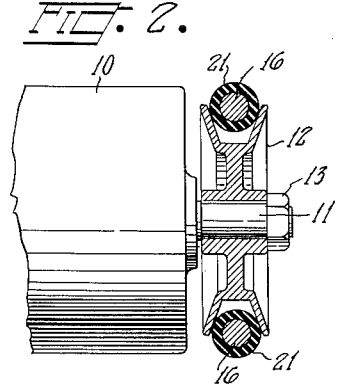
Fig. 2 is a section taken along the line 2—2 in Fig. 1.
Figure 3:
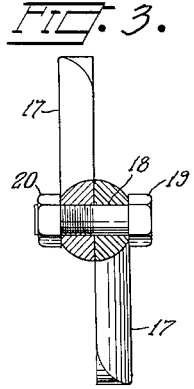
Fig. 3 is a section taken along the line 3—3 in Fig. 1.
Figure 5:
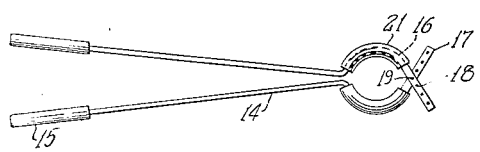
Fig. 5 is a side elevation of the holder set for use on a pulley of small diameter.
Figure 6:
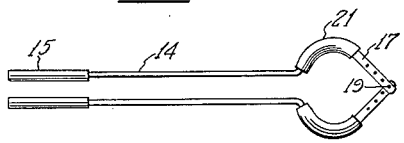
Fig. 6 is a view similar to Fig. 5 but showing the parts set for a pulley of larger diameter.
Figure 4:
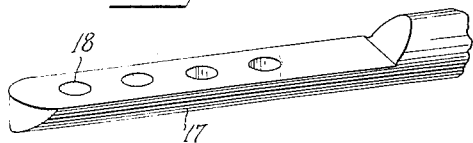
Fig. 4 is a fragmentary view showing the flattened end of one of the holder members.
Figure 4:

Referring in detail to the drawing, there is shown a generator 10 on whose shaft 11 is mounted a generator pulley 12 which is held in place by the nut 13.

The purpose of the holder is to prevent the pulley 12 from turning when the nut 13 is being rotated for tightening or loosening purposes.

The device itself consists of a pair of elongated handles 14 having rubber hand grips 15 on the ends thereof, and having the arcuate portions 16 formed on the oposite ends which terminate in the half round tangent portions 17 having the perforations 18 for the cap screw 19 on the end of which is placed a lock nut 20.

The arcuate portions 16 are covered with rubber tubes 21 which engage the V-groove 22 of the pulley 12.

It will be noted that the flat sides of portions 17 are in the median plane passing through the members 14.

In the use of this device it is only required that the parts 17 intersect at the right point to permit the rubber covered portions 16 to properly engage the pulley groove 22.

By means of this device, fragile die-cast pulleys may be easily and securely held without injury, while the nut 19 is turned.

I claim:

A holder for generator pulleys comprised of a pair of elongated handle members, each of which is provided with a rubber handle grip on one end and having a bend of approximately one hundred thirty-five degrees at the opposite end of said handle and terminating in a tip of half round cross section tangent to said bend and having a series of holes therethrough, the line of said handles intersecting said tips between their ends, said bends having round cross sections and rubber coverings therefor, said handles, bends and tips occupying the same plane, and means for pivotally connecting the perforated tips.

EDGAR F. CONRAD.

REFERENCES CITED

The following references are of record in the file of this patent:

UNITED STATES PATENTS

| Number | Name | Date |
|---|---|---|
| 1,281,575 | Ives | Oct. 15, 1918 |
| 1,994,415 | Edwards | Mar. 12, 1935 |
| 2,057,614 | Girard | Oct. 13, 1936 |
| 2,304,907 | Generals | Dec. 15, 1942 |